United States Patent [19]
Burd et al.

[11] Patent Number: 5,378,003
[45] Date of Patent: Jan. 3, 1995

[54] MECHANIC'S CREEPER

[75] Inventors: Wayne D. Burd, High Ridge; Charles D. Mills, St. Louis, both of Mo.

[73] Assignee: Koller Enterprises, Inc., Fenton, Mo.

[21] Appl. No.: 64,419

[22] Filed: May 20, 1993

[51] Int. Cl.⁶ ............................................. B25H 5/00
[52] U.S. Cl. ................................. 280/32.6; 280/47.16; 280/79.11
[58] Field of Search ............ 280/32.6, 32.5, 79.4, 280/79.7, 79.2, 79.3, 47.16, 79.11

[56] References Cited

U.S. PATENT DOCUMENTS

| | | | |
|---|---|---|---|
| D. 230,971 | 3/1974 | Shanklin | D14/3 M |
| 284,586 | 9/1883 | Adams | 280/47.16 |
| 736,648 | 8/1903 | Steers, Sr. | 280/32.5 |
| 1,431,383 | 10/1922 | Edwards | 280/32.6 |
| 1,853,007 | 4/1932 | Stannard | 280/32.6 |
| 2,010,987 | 8/1935 | Hammer | 280/32.5 |
| 2,148,199 | 2/1939 | Heckman | 280/32.6 |
| 2,935,331 | 5/1960 | Ledgerwood | 280/79.3 |
| 4,060,252 | 11/1977 | Mowery | 280/79.11 |
| 4,986,558 | 1/1991 | Morris | 280/32.6 |
| 5,033,757 | 7/1991 | Lloyd | 280/47.16 |
| 5,078,280 | 1/1992 | Nordeen | 280/32.6 X |
| 5,088,752 | 2/1992 | Henderson et al. | 280/79.11 |
| 5,108,118 | 4/1992 | Schaevitz | 280/32.6 |
| 5,195,763 | 3/1993 | Scott et al. | 280/32.6 |
| 5,226,656 | 7/1993 | Mayer | 280/79.7 X |
| 5,226,763 | 3/1993 | Scott et al. | 280/32.6 |

FOREIGN PATENT DOCUMENTS

| | | | |
|---|---|---|---|
| 154419 | 5/1956 | Sweden | 280/32.6 |
| 732278 | 6/1955 | United Kingdom | 280/32.6 |

Primary Examiner—Brian L. Johnson
Assistant Examiner—Carla Mattix
Attorney, Agent, or Firm—Senniger, Powers, Leavitt & Roedel

[57] ABSTRACT

A creeper for supporting the body of a worker and facilitating movement of the worker under and around an object such as an automobile. The creeper comprises a platform having a top surface and an underside, and four corner casters mounted on the underside of the platform for spacing the platform above a generally flat horizontal floor and for facilitating rolling of the platform on the floor. The casters are so spaced with respect to the platform that lines connecting adjacent casters define a quadrangle with a corresponding caster at each corner of the quadrangle. A fifth caster is mounted on the underside of said platform within said quadrangle.

9 Claims, 3 Drawing Sheets

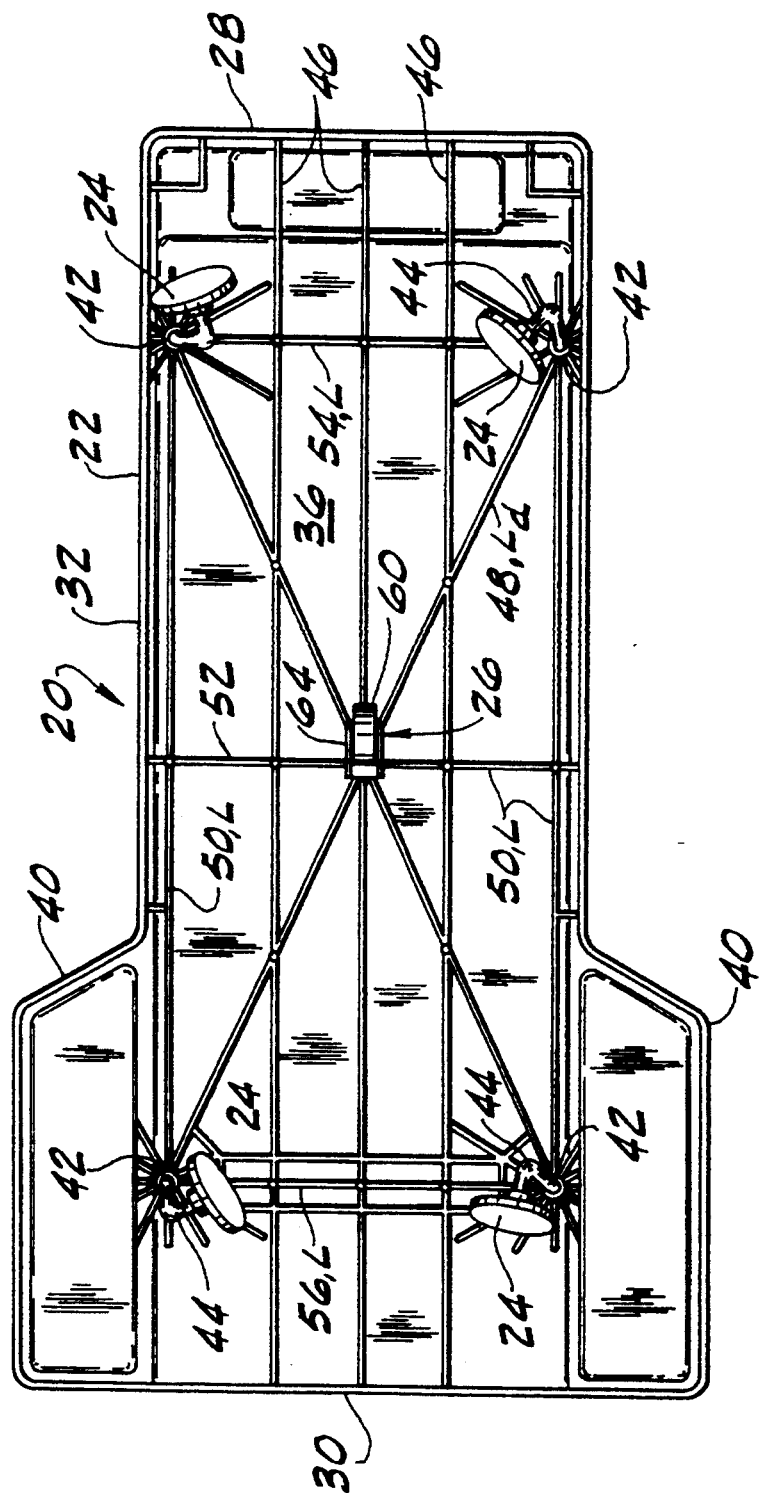

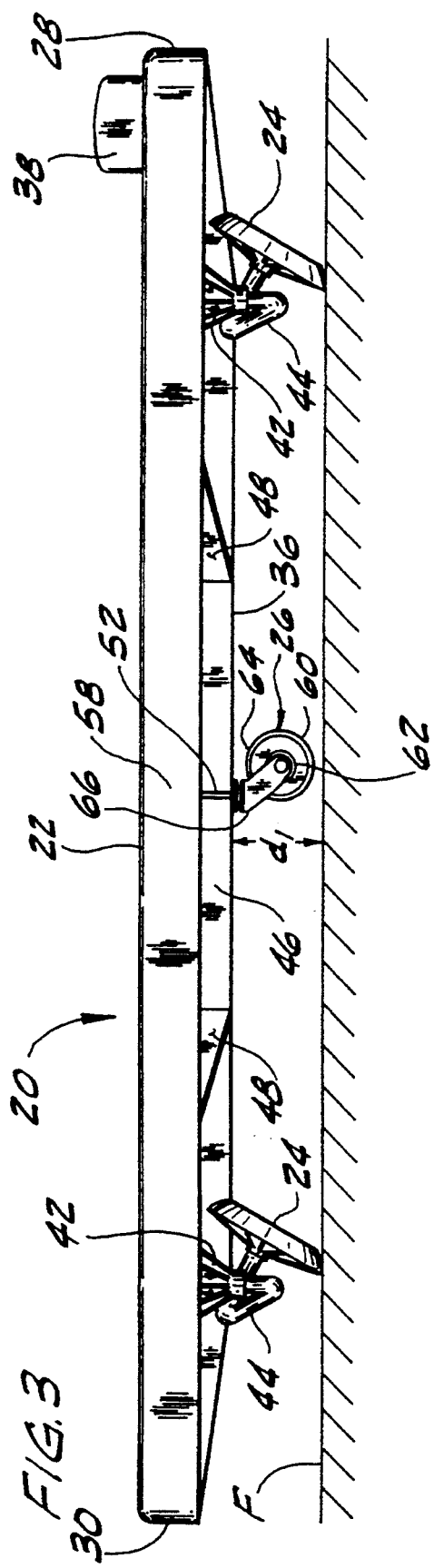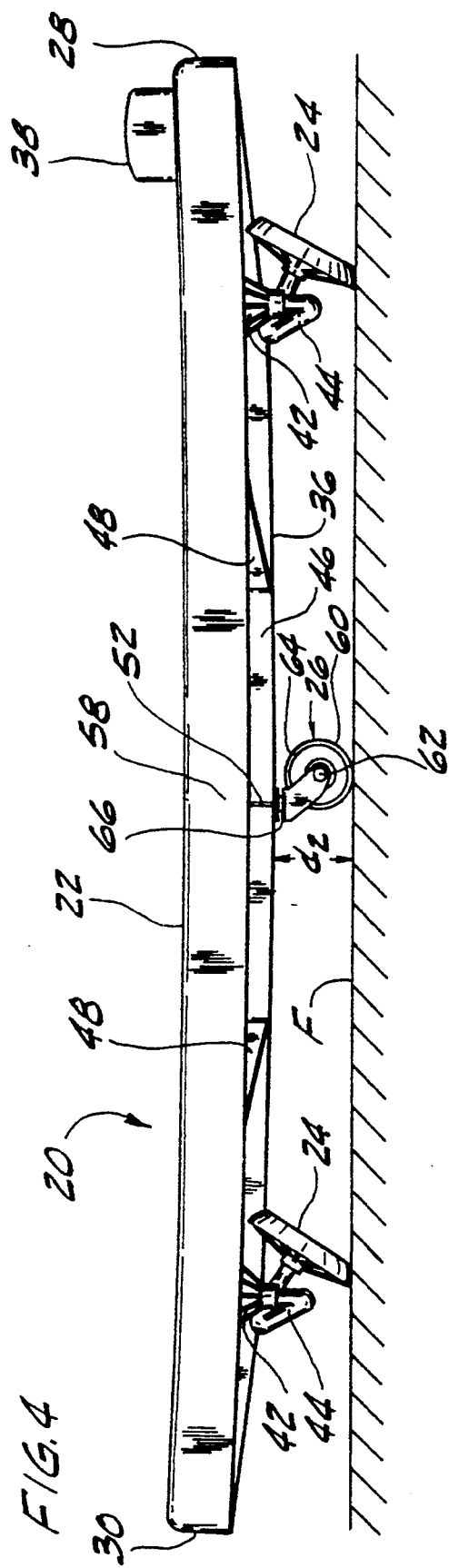

MECHANIC'S CREEPER

BACKGROUND OF THE INVENTION

This invention relates generally to a mechanic's creeper for supporting the body of a worker and facilitating movement of the worker under and around an object such as an automobile.

Creepers are commonly used by automobile mechanics for enabling the mechanics to readily access otherwise difficult-to-access locations such as the underside of an automobile. A typical creeper has a platform supported on four casters. A worker lays face-up on the platform and pushes against the floor with his/her feet to roll the creeper on the floor.

A problem associated with conventional creepers is that they are often difficult to roll or turn. Moving the creeper under an automobile or in tight locations is generally even more difficult because the worker does not have much room to maneuver. Also, a creeper of traditional design must be sufficiently rigid to prevent the platform from bowing excessively between the casters when a worker lays thereon. To maintain this rigidity for a given material, the platform must be relatively thick.

SUMMARY OF THE INVENTION

Among the objects of the present invention may be noted the provision of an improved creeper which overcomes the disadvantages and deficiencies associated with prior art creepers; the provision of such a creeper which is more easily rolled or pivoted on a surface; the provision of such a creeper which resists bowing of the platform while allowing a reduction in the amount of material required to make the platform; and the provision of such a creeper which is of relatively simple construction.

Generally a creeper of the present invention supports the body of a worker and facilitates movement of the worker under and around an object such as an automobile. The creeper comprises a platform having a top surface and an underside, and four corner casters mounted on the underside of the platform for spacing the platform above a generally flat horizontal floor and for facilitating rolling of the platform on the floor. The casters are so spaced with respect to the platform that lines connecting adjacent casters define a quadrangle with a corresponding caster at each corner of the quadrangle. A fifth caster is mounted on the underside of said platform within said quadrangle.

Other advantages and features will be in part apparent and in part pointed out hereinafter.

BRIEF DESCRIPTION OF THE DRAWINGS

FIG. 2 is a bottom plan view of the creeper of FIG. 1 showing casters mounted on a bottom surface of the platform;

FIG. 3 is a side elevational view of the creeper of FIG. 1 with the platform in a relaxed position in which the fifth caster is spaced above and out of contact with the floor; and FIG. 4 is a side elevational view similar to FIG. 3 showing the platform in a flexed position in which the 2417 platform bows downwardly and the fifth caster contacts the floor.

Corresponding reference characters indicate corresponding parts throughout the several views of the drawings.

DESCRIPTION OF THE PREFERRED EMBODIMENT

Figure 1:
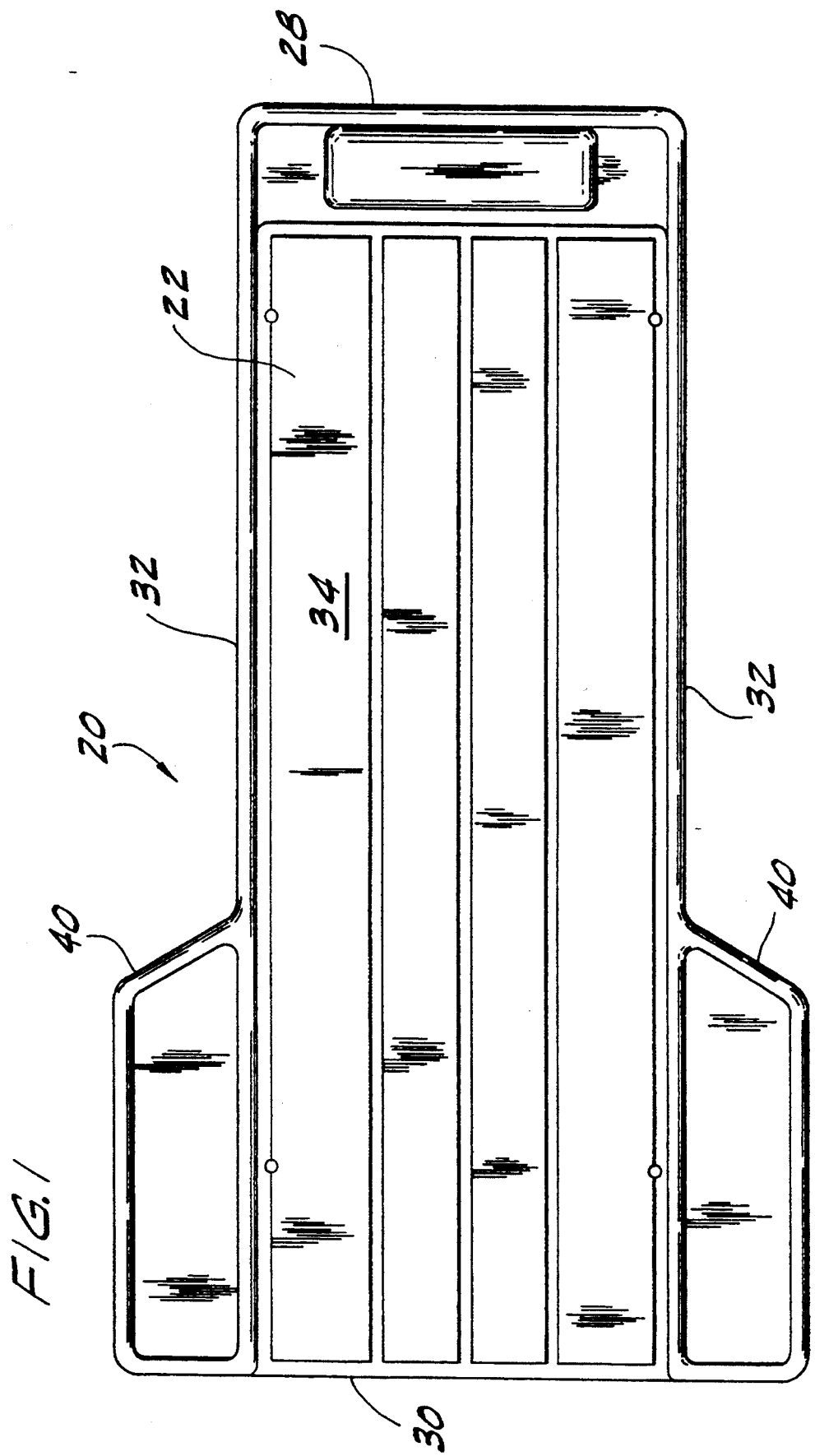
FIG. 1 is a top plan view of a creeper of the present invention showing the top surface of a platform.

Referring to FIGS. 1 and 2, a creeper of this invention, generally indicated at 20, is shown to include a platform 22, four corner casters 24, and a fifth caster 26. As discussed in greater detail below, the fifth caster 26 limits bowing of the platform 22 and provides improved maneuverability of the creeper 20.

The platform 22 is generally rectangular in shape and has a head end 28, a tail end 30, two sides 32, a generally planar top surface 34 and an underside 36. A head rest 38 for supporting the head of a user extends upwardly from the top surface 34 of the platform adjacent its head end 28. Storage compartments 40 for holding tools or parts extend laterally outwardly from opposite sides 32 of the platform 22, preferably adjacent its tail end 30.

As shown in FIGS. 2 and 3, the four corner casters 24 are preferably bent-axle type casters. The underside 36 of the platform 22 has four corner sockets 42, each of which receives one end of an axle 44 of one of the corner casters 24. Each axle 44 is journalled in its corresponding socket 42 for rotation about an axis generally perpendicular to the plane of the top surface 34. The corner casters 24 are so spaced with respect to the platform that lines L connecting adjacent casters define a quadrangle with a corresponding caster at each corner of the quadrangle. Preferably, the quadrangle formed by the connecting lines L is a rectangle having opposite short sides generally adjacent opposite ends 28 and 30 of the platform 22 and opposite long sides generally adjacent opposite sides 32 of the platform 22.

The underside 36 of the platform 22 includes three longitudinal ribs 46 extending the full length of the platform from its head end 28 to its tail end 30, two diagonal ribs 48 extending between nonadjacent corner sockets 42, two side ribs 50 adjacent the sides 32 of the platform 22 extending between adjacent sockets 42, a first lateral rib 52 extending between the sides 32 of the platform 22 and generally intersecting the intersection of the diagonal ribs 48, and second and third lateral ribs 54 and 56 extending between the two sockets 42 closest to the head end 28 and the two sockets 42 closest to the tail end 30, respectively. The side ribs 50 and the second and third lateral ribs 54 and 56 are generally collinear with the connecting lines L of the quadrangle. The ribs resist (but do not prevent) downward bowing of the platform. Preferably, the platform 22 is made of polypropylene, high density polyethylene, or any other suitable polymeric resin, and is preferably formed by injection molding. Alternatively, the platform 22 may be formed of wood or any other generally rigid, lightweight material. The entire platform 22 may be formed of one piece or multiple components. For example, the head rest 38 or storage compartments 40 may be pieces formed separately and attached to the rest of the platform. If formed separately, the head rest 38 may comprise a yieldable pad.

Referring to FIGS. 3 and 4, the corner casters 24 space the platform 22 above a generally flat floor F and facilitate rolling of the platform on the floor F. The platform 22 is resiliently flexible and adapted, upon accepting the weight of a person, resiliently to flex from a relaxed position (shown in FIG. 3) to a flexed position (shown in FIG. 4). In the relaxed position, an intermediate region 58 of the platform 22 between opposite ends 28 and 30 of the platform 22 is spaced a first distance $d_1$ above the floor F. In the flexed position, the platform 22 bows downwardly and the intermediate region 58 is spaced a second distance $d_2$ above the floor F. Distance $d_2$ is less than distance $d_1$.

The fifth caster 26 is mounted on the underside 36 of the platform 22 within a central portion of the quadrangle. Preferably, the fifth caster 26 is located adjacent the intersection of diagonal lines $L_d$ connecting nonadjacent corners of the quadrangle. The diagonal lines $L_d$ are collinear with the diagonal ribs 48. Thus, the fifth caster 26 is mounted on the underside 36 of the platform 22 generally at the intersection of the diagonal ribs. The fifth caster, generally designated 26, is preferably a clevis-mounted caster comprising a wheel 60 mounted for rotation about a horizontal axis on an axle 62 carried by a clevis 64 having a vertical shaft at its upper end and journalled in a suitable bearing socket 66 integrally formed with the platform on its underside 36. The fifth caster 26 is spaced above and out of contact with the floor F when the platform 22 is in its relaxed position (see FIG. 3) and contacts the floor F and further supports the platform when the platform is in its flexed position (see FIG. 4). Because of the fifth caster 26, the spacing between the intermediate region 58 of the platform 22 and the floor F is never less than the second distance $d_2$. Thus, the fifth caster 26 limits flexing of the platform 22. Since flexing is so limited, the platform 22 need not have as great an inherent rigidity as it would need if no fifth caster were present. A platform that would flex excessively without the fifth caster may be suitable when the fifth caster is employed. For example, a platform with a uniform thickness (i.e., one having no ribs or other support members) employing the fifth caster would not need to be as thick as a platform of uniform thickness without the fifth caster. Thus, with the fifth caster 26, the platform may be made of less material. Although not shown by FIGS. 3 and 4, the fifth caster 26 also limits downward bowing of the platform 22 between the sides 32 of the platform 22.

In addition to limiting flexing, centrally locating the fifth caster 26 within the quadrangle decreases the effort required by a worker to move the creeper 20 on the floor. The fifth caster 26 makes it easier both to roll the creeper in a straight line (e.g., longitudinally) and to turn or pivot the creeper.

In use, the creeper 20 is placed on the floor with the corner casters 24 engaging the floor and spacing the platform 22 above the floor. When the creeper is in its relaxed (unloaded) state, the fifth caster 26 is out of contact with the floor so that it does not cause the creeper 20 to rock. A worker then lays face-up on the top surface 24 with the back of his/her head contacting the head rest and with his/her legs extending over the tail end 30 of the platform 22. The weight of the worker causes the platform 22 to flex downward to the degree that the fifth caster 26 engages and further supports the platform 22. The worker then pushes against the floor with his/her feet to propel the creeper 20 and himself-/herself.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A creeper for supporting the body of a worker and facilitating movement of the worker under and around an object such as an automobile, the creeper comprising:

a platform having a top surface and an underside;
   four corner casters mounted on the underside of said platform for spacing the platform above a generally flat horizontal floor and for facilitating rolling of the platform on the floor, said casters being so spaced with respect to said platform that lines connecting adjacent casters define a quadrangle with a corresponding caster at each corner of the quadrangle;
   a fifth caster mounted on the underside of said platform within a central portion of said quadrangle;
   said corner casters and fifth caster being adapted for simultaneously contacting the floor and supporting the platform when the worker rests upon the top surface of the platform; and
   said platform being resiliently flexible and adapted, upon accepting the weight of a person, to flex from a relaxed position in which an intermediate region of the platform between opposite ends of the platform is spaced a first distance above the floor, to a flexed position in which the platform bows downwardly and the intermediate region is spaced a second distance above the floor less than said first distance.

2. A creeper as set forth in claim 1 wherein said fifth caster is mounted adjacent a diagonal line connecting nonadjacent corners of the quadrangle.

3. A creeper as set forth in claim 1 wherein said fifth caster is located adjacent the intersection of diagonal lines connecting nonadjacent corners of the quadrangle.

4. A creeper as set forth in claim 1 wherein said quadrangle is generally rectangular.

5. A creeper as set forth in claim 4 wherein said fifth caster is mounted adjacent a diagonal line connecting nonadjacent corners of the quadrangle.

6. A creeper as set forth in claim 4 wherein said fifth caster is located adjacent the intersection of diagonal lines connecting nonadjacent corners of the quadrangle.

7. A creeper as set forth in claim 6 wherein said platform further comprises storage compartments extending laterally outwardly from opposite sides of the platform.

8. A creeper as set forth in claim 1 wherein said fifth caster is spaced above and out of contact with the floor when the platform is in its said relaxed position and wherein the fifth caster contacts the floor and further supports the platform when the platform is in its said flexed position.

9. A creeper as set forth in claim 8 wherein said fifth caster is spaced above and out of contact with the floor when the platform is in its said relaxed position and wherein the fifth caster contacts the floor and further supports the platform when the platform is in its said flexed position.

* * * * *